US 6,681,122 B2

(12) United States Patent
Dwornik

(10) Patent No.: US 6,681,122 B2
(45) Date of Patent: Jan. 20, 2004

(54) SYSTEM AND METHOD FOR SELECTIVELY ENABLING TRANSMIT/RECEIVE MODES OF A RADIO TRANSCEIVER

(75) Inventor: Glen A. Dwornik, Bellingham, WA (US)

(73) Assignee: Harris Broadband Wireless Access, Inc., Bellevue, WA (US)

( * ) Notice: Subject to any disclaimer, the term of this patent is extended or adjusted under 35 U.S.C. 154(b) by 22 days.

(21) Appl. No.: 09/893,430

(22) Filed: Jun. 29, 2001

(65) Prior Publication Data
US 2003/0003860 A1 Jan. 2, 2003

(51) Int. Cl.[7] .................................................. H04B 1/38
(52) U.S. Cl. ................... 455/557; 455/343.1; 455/3.01; 455/14; 455/15; 455/17; 455/67.11; 455/68; 370/316
(58) Field of Search ............................. 455/557, 343.1, 455/3.01, 14, 15, 17, 67.11, 68; 375/222; 370/316

(56) References Cited

U.S. PATENT DOCUMENTS

| | | | |
|---|---|---|---|
| 4,683,565 A | * 7/1987 | Hanulec | 370/496 |
| 4,747,160 A | 5/1988 | Bossard | |
| 5,420,851 A | 5/1995 | Seshadri et al. | |
| 5,678,228 A | * 10/1997 | Soleimani et al. | 370/311 |
| 5,768,254 A | 6/1998 | Papadopoulos et al. | |
| 5,809,431 A | 9/1998 | Bustamante et al. | |
| 5,828,695 A | 10/1998 | Webb | |
| 5,884,140 A | * 3/1999 | Ishizaki et al. | 455/2.01 |
| 5,890,055 A | 3/1999 | Chu et al. | |
| 6,006,069 A | 12/1999 | Langston | |
| 6,016,311 A | 1/2000 | Gilbert et al. | |
| 6,324,379 B1 | * 11/2001 | Hadden et al. | 455/3.01 |
| 2002/0102948 A1 | * 8/2002 | Stanwood et al. | 455/91 |

* cited by examiner

Primary Examiner—William Trost
Assistant Examiner—Danh C Le
(74) Attorney, Agent, or Firm—Duane Morris LLP

(57) ABSTRACT

The present invention relates to a method and apparatus for selectively enabling and disabling transmit and receive functions of a radio, and more particularly to a system and method utilizing an out-of-band signal over a time division duplex channel to control transmit and receive functions of a radio so as to synchronize with the functions of a remote modem.

The invention relates to a system and method for synchronizing the transmit and receive modes of a radio via an out of band signal. The out of band signal is preferably a control tone at a predetermined frequency and is substantially coextensive with the communication signal to be transmitted. The radio filters a multiplexed signal and detects if the control tone is present. If the control tone is not detected, the radio preferably remains in the default receive mode. If the control tone is detected, the radio operates in the transmit mode for the duration of the control signal.

33 Claims, 3 Drawing Sheets

SYSTEM AND METHOD FOR SELECTIVELY ENABLING TRANSMIT/RECEIVE MODES OF A RADIO TRANSCEIVER

BACKGROUND OF THE INVENTION

Wireless radio links have become increasingly important to provide data communication links for a variety of applications. For example, Internet Service Providers have begun to utilize wireless radio links within urban settings to avoid the installation expense of traditional wired connections or optical fiber. The typical architecture of such wireless systems involves establishing an outdoor unit at a node of the wireless system. The outdoor unit contains an antenna and a transceiver. Additionally, the radio unit is connected via a cable to an indoor unit. The indoor unit contains a modem to recover the digital data contained within the received signal and to add digital data to a carrier for ultimate transmission by the radio unit. The separation of functionality between indoor units and outdoor units has been maintained for several reasons. Among these reasons, maintenance of an indoor unit facilitates greater thermal stability of the modem unit and further increases reliability of the communication link. Additionally, the communication channel between the indoor unit and the outdoor unit is often allocated utilizing a Time Division Duplex (TDD) scheme, i.e. the communication over the cable successively alternates between receive and transmit modes.

By maintaining separate modem and radio functionality and utilizing a TDD scheme, these systems require some method of synchronizing the modem and radio units. The synchronization mechanism ensures that both units will be in receive and transmit modes at the proper times. Known systems utilize a unique word (a series of pre-defined digital symbols for detection by the radio unit) to derive a frame pulse. Each frame pulse results in a counter being reset. The radio unit is preprogrammed to define transmit and receive time slots based upon this counter. Accordingly, the modem is capable of causing the radio unit to synchronize to the modem by signaling the unique word. Additionally, dynamic variations in transmit and receive slots may be implemented by signaling time slot parameters via a control channel.

The use of a unique word and time slot parameters suffers several limitations. First, the use of a unique word and time slot parameters prevents rapid variation in time slot duration. Specifically, the bandwidth utilized to signal the unique word as well as the time slot parameters is not sufficient to permit dynamic allocation of the communication channel on a millisecond by millisecond basis. It is anticipated that more efficient channel access methods will be required for point-to-multipoint systems as these systems provide services to a greater number of users. Accordingly, dynamic and rapid variation of time slots is a valuable mechanism for maximizing the efficiency of such access methods. Additionally, the use of a unique word is problematic, since the timing of the system relies upon the frame pulse. If a unique word is not detected and a frame pulse is consequently missed, the timing information may become skewed which could cause the communication link to be broken. Accordingly, unique word synchronization involves a degree of inherent unreliability.

The present invention is directed to a system and method which selectively enable and disable the transmit and receive functions of a radio. In the preferred embodiment, a modem and a radio are remotely located. The modem and radio preferably communicate via an IF signal over a communication channel in a Time Division Duplex manner, i.e. the same communication channel is alternatively allocated as a transmit path and a receive path. Additionally, the modem preferably creates an unique frequency as a discrete out-of-band tone. The transmit path of the radio preferably filters the tone from the received signal. The radio preferably contains a separate mechanism to detect the out-of-band tone. This mechanism converts the out-of-band tone to a logical signal. If the logical signal is present, the radio operates through the transmit path. Preferably, the radio defaults to the receive path if the logical signal is not present.

According, certain embodiments of the present invention provide a more robust mechanism for dynamically controlling transmit and receive functions between separate modem and radio modules. Certain embodiments the present invention provide a more easily detected signaling mechanism for dynamically controlling the transmit and receive functions between separate modem and radio modules. Also, certain embodiments of the invention provide a mechanism for dynamically controlling transmit and receive functions between separate modem and radio modules that requires minimal switching times.

One embodiment of the present invention avoids the problems of the prior art by providing a control signal from the modem to the transceiver where said control signal is substantially coextensive with the communication signal being sent by the modem to the transceiver for transmission. The control signal and the communication signal may be sent over the same cable connecting the modem and the transceiver. In the situation where the control signal and the communication signal are sent over the same cable, the control signal preferably is at a frequency different than the frequency of the communication signal so as to avoid material interference between the two signals. The control signal may be a tone.

In a preferred embodiment, the transceiver is normally in receive mode and is in transmit mode for the duration of the control signal. The control signal is not sent from the modem as a part of the communication signal to set the transmit and receive slots via a counter thereby taking up valuable bits in the communication signal and thereby delaying the switching of the transceiver between modes. The control signal, unlike a unique word in the prior art, does not set a counter which defines the transmit slot of the transceiver.

Accordingly, it is an object of the present invention to provide a more robust mechanism for dynamically controlling transmit and receive functions between separate modem and radio modules.

It is another object of the present invention to provide a more easily detected signaling mechanism dynamically controlling the transmit and receive functions between separate modem and radio modules.

It is yet another object of the present invention to provide a mechanism for dynamically controlling transmit and receive functions between separate modem and radio modules that require switching times.

It is still another object of the present invention to provide a control signal from a modem to a transceiver where the control signal is substantially coextensive with, and at a different frequency than, a communication signal to be transmitted.

It is a further object of the present invention to provide a control signal from a modem to a transceiver wherein the transceiver remains in the transmit mode only for the duration of the control signal.

It is yet a further object of the present invention to provide a control signal and a communication signal from a modem to a transceiver over the same cable at different frequencies.

These and many other objects and advantages of the present invention will be readily apparent to one skilled in the art to which the invention pertains from a perusal of the claims, the appended drawings, and the following detailed description of the preferred embodiments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Figure 1A:
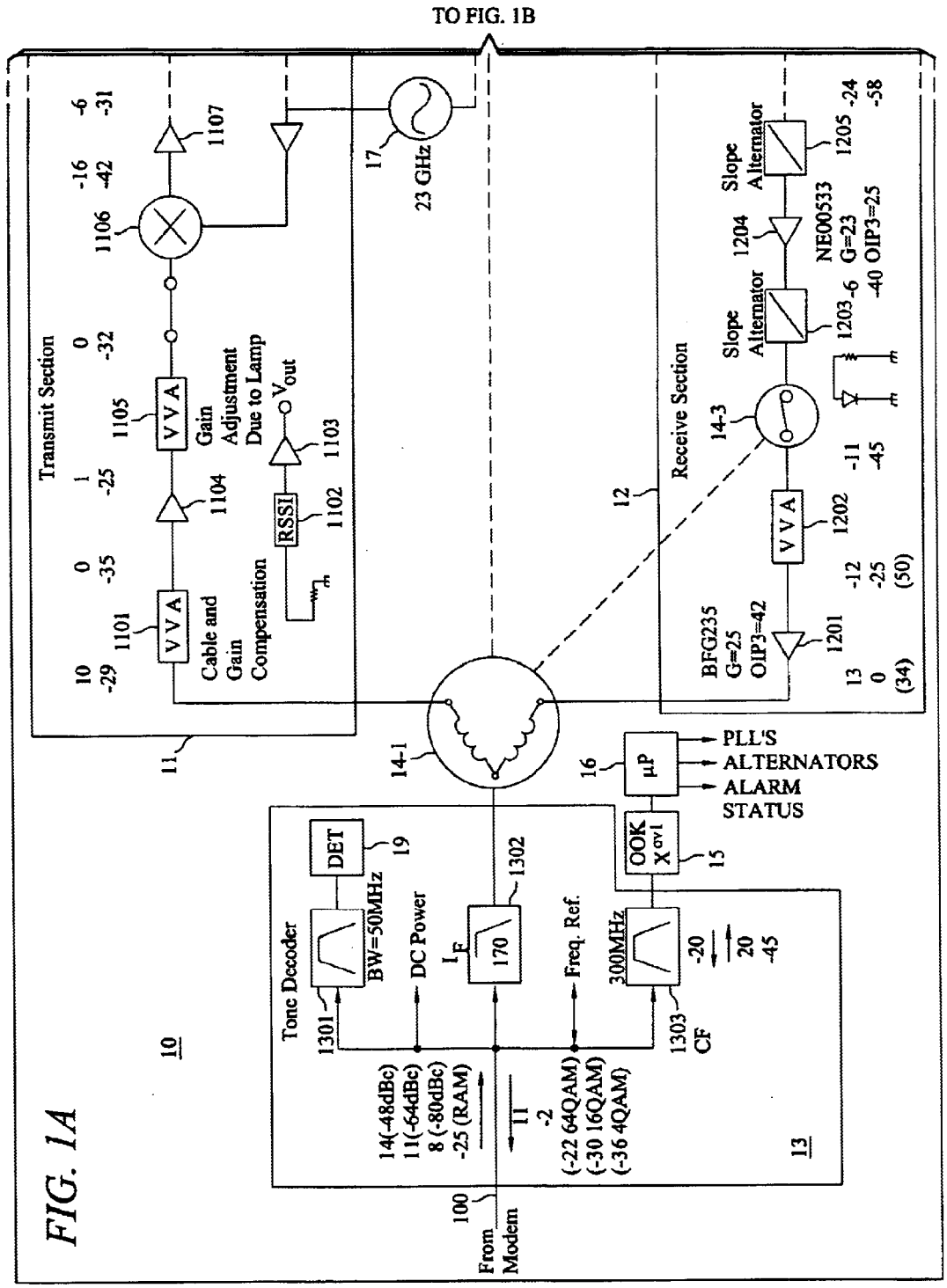
FIGS. 1A and 1B depict an exemplary embodiment of a RF Subsection Diagram illustrating receive and transmit paths controlled by the present invention.
Figure 1B:
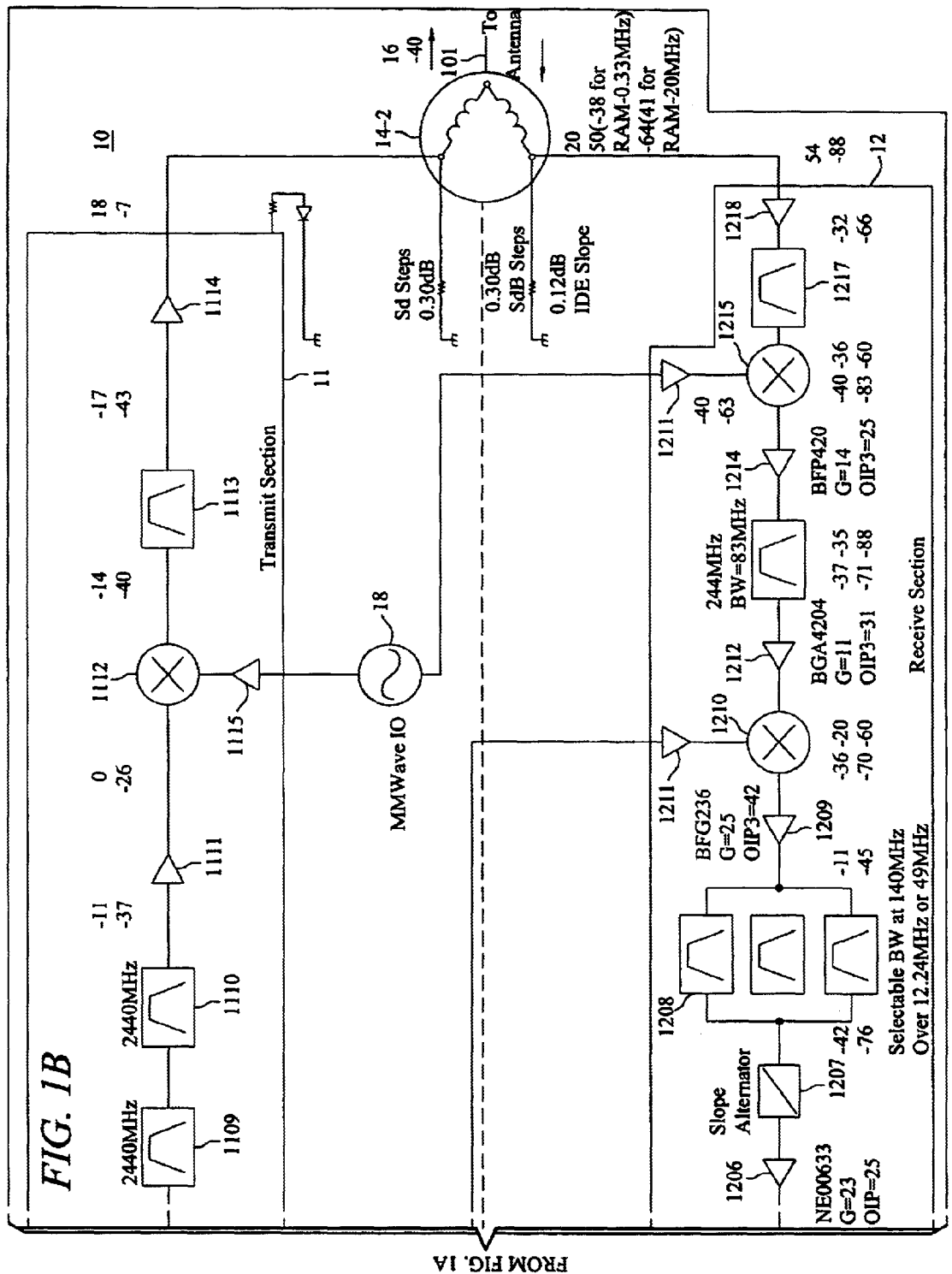

Turning now to FIGS. 1A and 1B, millimeter wave transceiver 10 implements a preferred embodiment of the present invention. The remotely located modem (not shown) communicates a multiplexed signal via cable connection 100 to transceiver 10, which contains transmit section 11 and receive section 12. In this preferred embodiment, the modem is an on/off keying modem associated with indoor equipment with transceiver 10 and the antenna being associated with an outdoor unit. Cable connection 100 provides a bi-directional link. The bi-directional link is alternatively allocated between transmit and receive signaling in a Time Division Duplex (TDD) scheme. Additionally, transceiver 10 receives commands from indoor equipment. Similarly, transceiver 10 reports status and alarm information to the indoor equipment.

In a preferred embodiment, cable connection 100 is coupled to pentaplexer 13. Pentaplexer 13 implements functionality to allow multiplexing of five signals via the single communication link between the modem assembly and transceiver 10. The five signals include one DC power signal to power transceiver 10, a high stability frequency source, a reference signal to synchronize the local oscillators 17 and 18 for the up-conversion and down-conversion, a communication signal, and a tone control signal. As previously noted, this preferred embodiment remotely locates the modem from transceiver 10. In practice, the modem may be located at any distance including co-location utilizing a single commercially available cable.

Transceiver 10 contains switch 14. Switch 14 comprises three sub-components 14-1, 14-2, and 14-3. When the switch sub-components (14-1, 14-2, 14-3) are in the upper state, transceiver 10 is in transmit mode. Conversely, when the switch subcomponents are in the lower state, transceiver 10 is in receive mode. In transmit mode, the IF signal is received via cable connection 100, processed through transmit section 11 (as will be detailed later), and outputted via antenna connection 101. In receive mode, the RF receive signal is received from antenna connection 101, processed through receive section 12 (as will be detailed later), and outputted via cable connection 100. Oscillators 17 and 18 are preferably designed to be common to both the receive and transmit sections.

In transmit mode, the modem generates a RF signal communicated to transceiver 10 via cable connection 100. The RF signal contains an IF modulated data signal that will be up-converted for transmission via the antenna. In a preferred embodiment, the IF signal is a 140 MHz signal. In other embodiments, the IF signal is one of the following frequencies: 70, 280, 480 MHz. Additionally, the RF signal contains the tone control signal, which preferably possesses a frequency within the range of 5–50 MHz. In an embodiment, the control tone possesses a frequency of 35 MHz. As previously noted, certain embodiments may utilize a high stability frequency source (i.e., a timing reference signal) to synchronize the local oscillators 17 and 18. In such embodiments, the control tone may be implemented as a convenient harmonic of the frequency associated with the timing reference signal. Preferably, the tone control is sufficiently separated from the 140 MHz IF signal to avoid interference. The IF signal passes through filter 1301 and, in a preferred embodiment, is band-limited filtered to a spectrum width of 50 MHz. It shall be appreciated that other bandwidths for the filter are contemplated so long as the control signal can be distinguished from the communication signal. Detector 19 receives the band-limited signal to determine whether the modem has communicated the tone control signal. Detector 19 produces a logical signal. If detector 19 detects the tone control signal, detector 19 cause the logical signal to represent a true state. If the logical signal is true, switch 14 causes sub-components 14-1, 14-2, and 14-3 to remain in or transition to the upper state. If the logical signal is false, switch 14 causes sub-components 14-1, 14-2, and 14-3 to remain in or transition to the lower state. Preferably, the detector 19 causes the logical signal to default to the false state. Thus, transceiver 10 defaults to receive mode.

It shall be appreciated by those skilled in the art that the present method and system employing a detector and an out of band control tone provides significantly lower switching times. Use of a control tone in lieu of a unique word considerably simplifies the detection mechanism. Additionally, the use of a control tone is more robust than the unique word approach. Systems employing the unique word approach are more vulnerable to timing errors due to noise. Since the unique word is signaled by a predetermined series of symbols, timing errors may occur if one or a few symbols of the unique word are improperly decoded due to noise. However, the present invention does not involve this limitation. The present invention does not detect the control tone in a dependent manner based upon prior states. Accordingly, the timing functionality of the present invention is more resistant to thermal noise and interference. Moreover, utilizing the control tone to dynamically schedule transmit and receive modes requires far less bandwidth than communicating receive and transmit frame parameters via a control channel. Accordingly, the control tone facilitates dynamic alteration of the receive and transmit timing in a more efficient manner.

When the transceiver is in receive mode, switch sub-components 14-1, 14-2, and 14-3 remain in the lower state. This allows RF signals received by the antenna from cable 101 to pass through switch sub-component 14-2 to linear amplifier 1218. After amplification, the RF signal passes through band-pass filter 1217 and down conversion mixer 1215. Down conversion mixer 1215 is coupled to local oscillator 18 via amplifier 1216. The signal passes through a second amplifier 1214, a second band-pass filter 1213, and a second buffer 1212. The signal passes through down-conversion mixer 1210 and IF amplifier 1209. Down-conversion mixer 1210 is coupled to local oscillator 17 via amplifier 1211. Filter component 1208 selectively filters the signal by selecting from a plurality of predetermined bandwidths. The signal is processed by slope attenuator 1207 to provide slope compensation. The signal is additionally amplified by linear amplifier 1204. Additional slope compensation is provided by slope attenuator 1204. Additional slope compensation is provided by slope attenuator 1203. The signal is path is continued by switch sub-component 14-3, which provides further path isolation. The signal is further processed by voltage variable attenuator 1202. The signal passes through buffer amplifier 1201 and switch sub-component 14-1 to pentaplexer 13 via filter 1302. Pentaplexer 13 multiplexes the processed IF signal for communication over cable connection 100 to the modem.

When the tone control signal is detected and the logical signal state is true, the transceiver operates in transmit mode. Switch sub-components 14-1, 14-2, and 14-3 are maintained in the upper state. In transmit mode, the modem produces and multiplexes a pay-load IF signal via cable connection 100. The IF signal is received by pentaplexer 13. The signal is filtered by filter 1302 and proceeds via switch sub-component 14-1 to voltage variable attenuator 1101 for cable and gain compensation. The signal passes through IF amplifier 1104 and voltage variable attenuator 1105 that provides gain adjustment due to temperature variation. The signal is up-converted by mixer 1106. Mixer 1106 is coupled to local oscillator 17 via amplifier 1108. The signal is successively filtered by bandpass filters 1109 and 1110. The signal is further amplified by amplifier 1111 before up-conversion to millimeter wave range by mixer 1112. Mixer 1112 is coupled to local oscillator 18 via amplifier 1115. The millimeter wave signal is filter by bandpass filter 1113 and amplified by amplifier 1114. Since the control tone has been detected and the logical signal is true, switch 14-2 completes the circuit path allowing the processed signal to proceed to the antenna via antenna connection 101.

The modem also generates an auxiliary modem signal communicated via cable connection 100. The auxiliary modem signal is separated from the main IF signal and is received by on/off keying transceiver item 15. Microprocessor 16 controls the synthesizers and switches internal to transceiver 10 assembly via the data stream from the modem communicated by the auxiliary signal. Microprocessor 16 also communicates status information in the reverse direction to the modem. Additionally, the microprocessor may control detector 19 to operate the logical signal independently of the out of band signal. In this manner, the transceiver may be made compatible with modems that do not employ the present invention.

Figure 2:
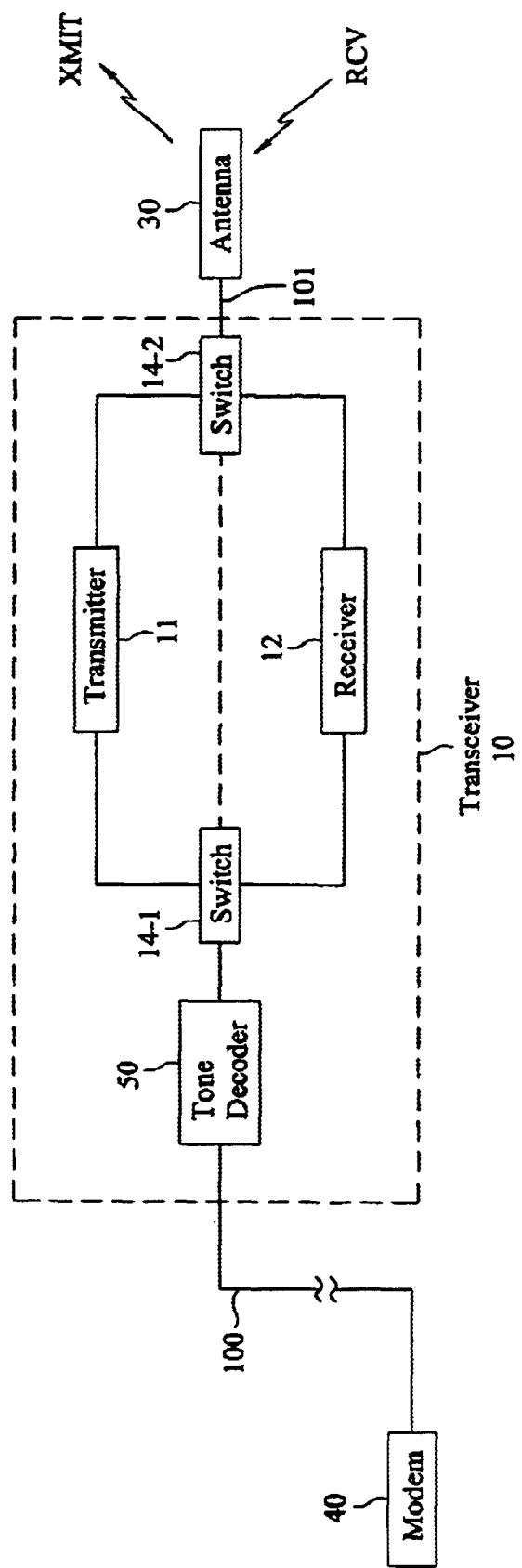
FIG. 2 is a functional block diagram depiction of the present invention.

With reference now to FIG. 2, where like components have like numbers and function in a like manner to the similar numbered components in FIGS. 1A and 1B, the modem 40 is connected to the transceiver 10 via the cable 100. The transceiver 10 includes the tone decoder 50 which includes the filter 1301 and the detector 19. The tone decoder is connected to the switch 14-1, which operates in conjunction with switch 14-2 and switch 14-3 (not shown), all of which operate to allow the transceiver to function in either the transmit or receive modes as previously described. The switch 14-2 is connected to the antenna 30 which transmits outgoing communication signals and receives incoming communication signals.

It shall be appreciated that the preceding circuitry and signal path descriptions are merely exemplary. The transmit and receive sections are shown solely as a representative circuit. Any transmit and receive circuitry may be utilized. Additionally, any frequency ranges may be implemented with the present invention. Moreover, the control tone is not limited to a 35 MHz signal. The present invention may employ any other control signal provided that sufficient separation (at either end of the working frequency, or within the working frequency) is utilized to allow detection of the control signal. Also, the control tone signal need not be continuous. The control tone may be transmitted from time to time, depending upon system requirements.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In a millimeter wave communication system having a modem operatively connected by a cable to a transceiver to provide the transceiver with a communication signal to be transmitted, the transmit/receive mode of said transceiver being controlled by a control signal from said modem, the improvement:

wherein said control signal and said communication signal are provided from said modem to said transceiver over the same cable at different frequencies; and wherein said transceiver remains in the transmit mode only for the duration of said control signal.

2. The system of claim 1 wherein said control signal is a tone.

3. The system of claim 2 wherein said control signal is centered at a predetermined frequency.

4. The system of claim 3 wherein said control signal is at a frequency of about 35 MHz.

5. The system of claim 2 wherein said communication signal is at a frequency of about 480 MHz.

6. The system of claim 1 wherein said communication signal is at a frequency of about 70 MHz.

7. The system of claim 1 wherein said communication signal is at a frequency of about 140 MHz.

8. The system of claim 1 wherein said communication signal is at a frequency of about 280 MHz.

9. The system of claim 1 wherein said communication signal is at a frequency of about 480 MHz.

10. The system of claim 1 wherein the difference in frequency between said control signal and said communication signal is at least 50 MHz.

11. The system of claim 1 wherein said transceiver is located in close proximity to an antenna; and wherein said modem is spaced from said transceiver and said antenna.

12. The system of claim 1 wherein said transceiver is in receive mode when said control signal is not present at the transceiver.

13. The system of claim 1, wherein millimeter wave communication system is a time division duplexed system.

14. In a millimeter wave communication system having a modem operatively connected by a cable to a transceiver to provide the transceiver with a communication signal to be transmitted, a method of maintaining the transceiver in the transmit mode for the transmission of the communication signal comprising the step of providing over the same cable the transceiver with a control signal substantially coextensive with the communication signal, wherein the control signal is a tone at a predetermined frequency sufficiently different from the frequency of the communication signal to avoid material interference therewith.

15. The system of claim 14 wherein said control signal is at a frequency of about 35 MHz.

16. The system of claim 14 wherein said communication signal is at a frequency of about 70 MHz.

17. The system of claim 14 wherein said communication signal is at a frequency of about 140 MHz.

18. The system of claim 14 wherein said communication signal is at a frequency of about 280 MHz.

19. The system of claim 14 wherein said communication signal is at a frequency of about 480 MHz.

20. The system of claim 14 wherein the difference in frequency between said control signal and said communication signal is at least 50 MHz.

21. The method of claim 14 including the step of applying only the communication signal to the transmitter portion of the transceiver.

22. The system of claim 14 wherein said transceiver is in receive mode when said control signal is not present at the transceiver.

23. The system of claim 14, wherein the millimeter wave communication system is a time division duplexed system.

24. In a millimeter wave communication system having a modem operatively connected by a cable to a transceiver to provide the transceiver with a communication signal to be transmitted, said transceiver being preferentially in receive mode and switching to transmit mode in response to a control signal from said modem, the improvement:

wherein the transceiver switches from receive mode to the transmit mode and remains in transmit mode for the duration of said control signal; and wherein said control signal is separate from said communication signal and wherein a frequency difference exists between said control signal and said communication signal.

25. The system of claim 24 wherein said control signal is a tone.

26. The system of claim 25 wherein said control signal is centered at a predetermined frequency.

27. The system of claim 26 wherein said control signal is at a frequency of about 35 MHz.

28. The system of claim 24 wherein said communication signal is at a frequency of about 70 MHz.

29. The system of claim 24 wherein said communication signal is at a frequency of about 140 MHz.

30. The system of claim 24 wherein said communication signal is at a frequency of about 280 MHz.

31. The system of claim 24 wherein the difference in frequency between said control signal and said communication signal is at least 50 MHz.

32. The system of claim 24 wherein said transceiver is located in close proximity to an antenna; and wherein said modem is spaced from said transceiver and said antenna.

33. The system of claim 24, wherein the millimeter wave communication system is a time division duplexed system.

* * * * *